United States Patent [19]

Ferrari

[11] Patent Number: 5,200,138

[45] Date of Patent: Apr. 6, 1993

[54] SPECTRAL SHIFT-PRODUCING SUBASSEMBLY FOR USE IN A NUCLEAR FUEL ASSEMBLY

[75] Inventor: Harry M. Ferrari, Fox Chapel, Pa.

[73] Assignee: Westinghouse Electric Corp., Pittsburgh, Pa.

[21] Appl. No.: 740,342

[22] Filed: Aug. 5, 1991

[51] Int. Cl.⁵ .............................................. G21C 7/26
[52] U.S. Cl. ..................................... 376/209; 376/221
[58] Field of Search ........................ 376/209, 221, 447

[56] References Cited

U.S. PATENT DOCUMENTS

| | | | |
|---|---|---|---|
| 3,886,037 | 5/1975 | Schlenker | 176/68 |
| 4,371,495 | 2/1983 | Marlatt | 376/209 |
| 4,657,726 | 4/1987 | Lancaster et al. | 365/209 |
| 4,683,103 | 7/1987 | Lott et al. | 376/209 |
| 4,687,621 | 8/1987 | Ferrari | 376/209 |
| 4,687,627 | 8/1987 | Wilson et al. | 376/209 |
| 4,693,862 | 9/1987 | Tower et al. | 376/209 |
| 4,728,480 | 3/1988 | Baloh et al. | 376/209 |
| 5,075,069 | 12/1991 | Edlund et al. | 376/209 |

Primary Examiner—Donald P. Walsh
Assistant Examiner—Frederick H. Voss
Attorney, Agent, or Firm—J. C. Spadacene

[57] ABSTRACT

A spectral shift-producing subassembly is composed of a plurality of sealed empty water displacement rodlets incorporating a spectral shift-producing capability. Each of the rodlets includes an elongated tube sealed at its opposite ends and having an axially-extending annular wall section of reduced thickness compared to the thickness of the wall of the remainder of the rodlet. The respective reduced thicknesses of the axial wall sections of the rodlets can be varied to adapt the rodlets to rupture at different times and permit water to enter the rodlets to produce an increase in the water/fuel ratio and thereby an increase in reactivity. The rodlets can also have different levels of pressurization to initiate rupture at different times.

16 Claims, 3 Drawing Sheets

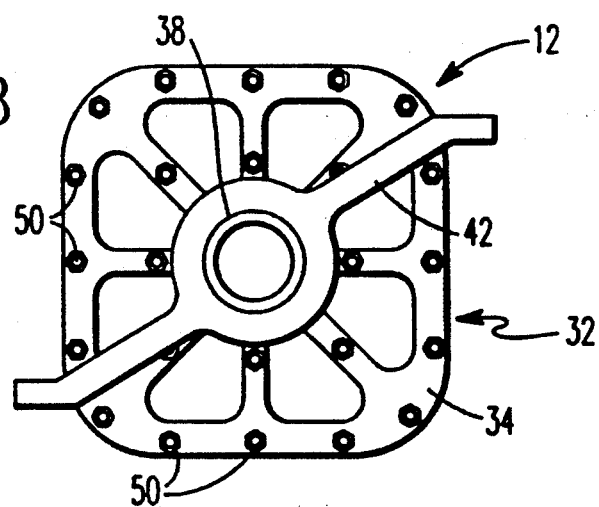
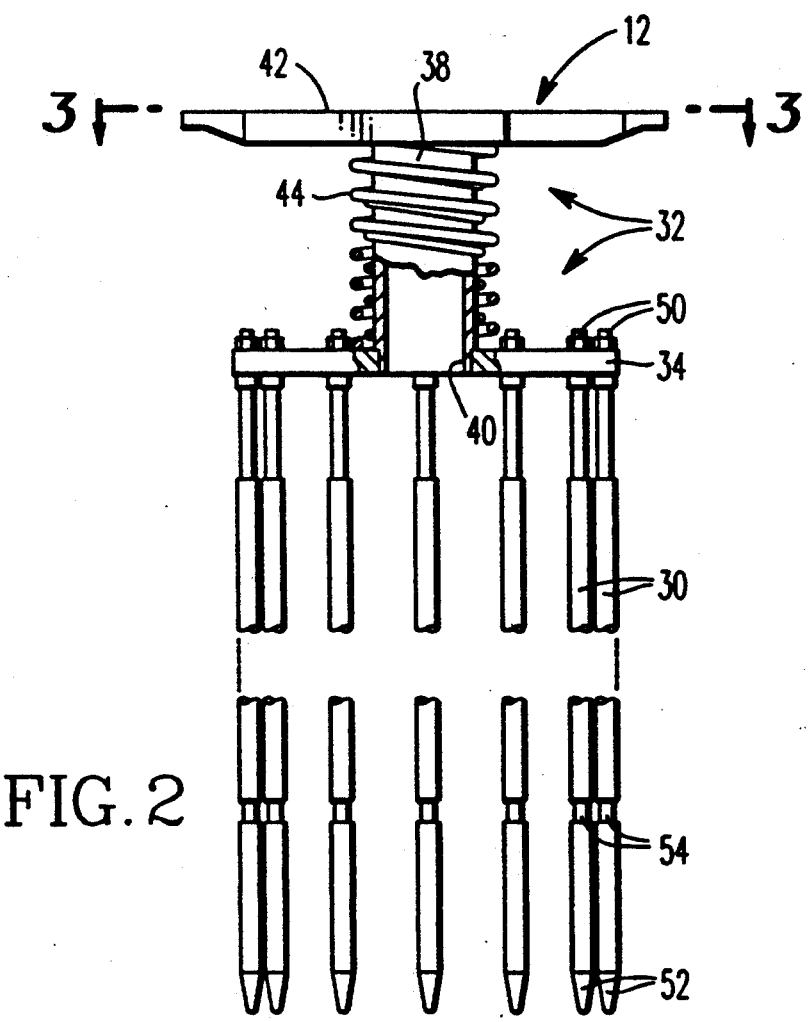

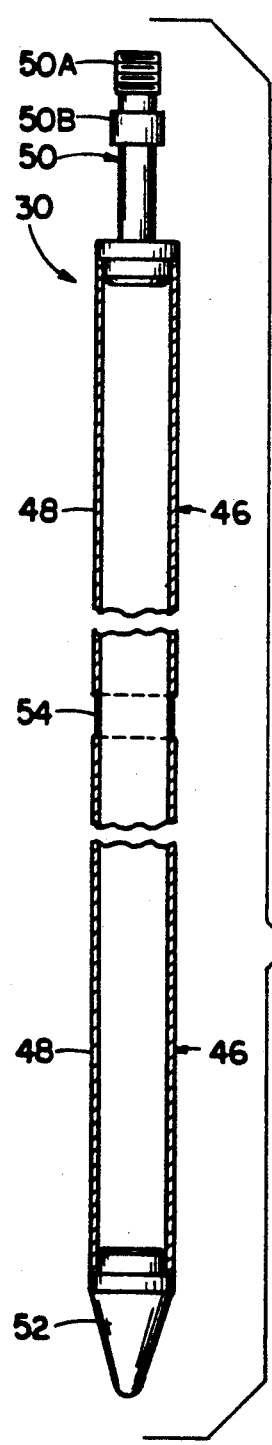
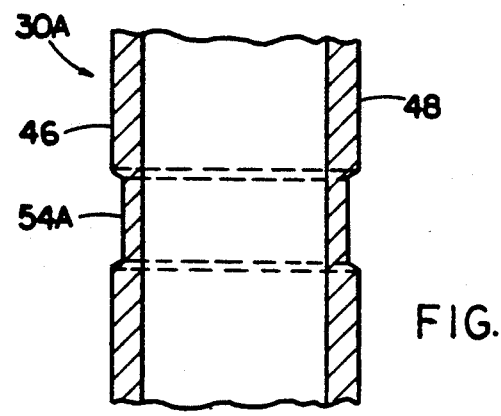
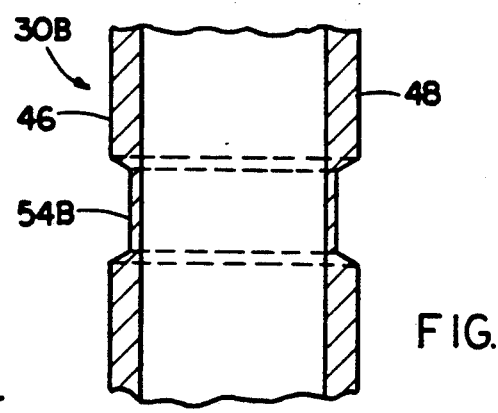
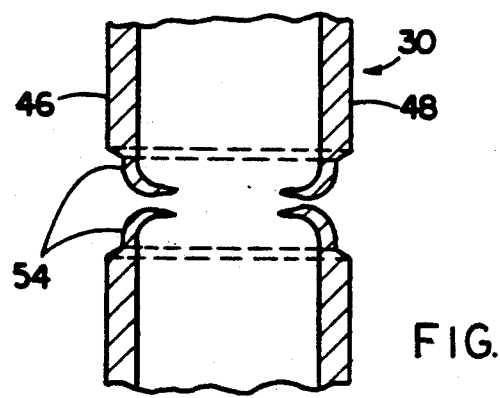
FIG. 4
FIG. 5
FIG. 6
FIG. 7

SPECTRAL SHIFT-PRODUCING SUBASSEMBLY FOR USE IN A NUCLEAR FUEL ASSEMBLY

BACKGROUND OF THE INVENTION

1. Field of the Invention

The present invention relates generally to nuclear reactors and, more particularly, is concerned with a nuclear fuel assembly employing a subassembly having spectral shift-producing rodlets which are adapted to rupture at different times and permit water to enter the rodlets to produce an increase in the water/fuel ratio and thereby an increase in reactivity.

2. Description of the Prior Art

In the conventional design of pressurized water reactors (PWR), an excessive amount of reactivity is designed into the reactor core at start-up so that as the reactivity is depleted over the life of the core there will still be sufficient reactivity to sustain core operation over a long period of time. However, since an excessive amount of reactivity is designed into the reactor core at the beginning of the core life, steps must be taken at that time to properly control it.

One technique to control reactivity is to produce an initial spectral shift which has the effect of increasing the epithermal (low reactivity) part of the neutron spectrum at the expense of the thermal (high reactivity) part. This results in production of fewer thermal neutrons and decreased fission. Then, as fission decreases during extended reactor operation, a reverse shift back to the thermal part of the neutron spectrum at the expense of the epithermal part is undertaken. Such control technique is primarily accomplished through the use of displacer rods. As the name implies, these rods are placed in the core to initially displace some of the moderator water therein and decrease the reactivity. Then, at some point during the core cycle as reactivity is consumed, the displacement associated with these rods is removed from the core so that the amount of moderation and therewith level of reactivity in the core are increased.

One approach contemplated for removing the displacement is to have membranes provided on the ends of the displacer rods which are penetrated at some point in time to allow the rods to be filled with water. A small heating element surrounding a specially indented end cap on the hollow displacer rod is turned on at an appropriate time. The heat weakens the indented part of the end cap to the point where the external water pressure opens the end cap and fills the rod with water.

Another approach used to remove the displacement is the provision of at least one rod in the fuel assembly filled initially with helium or other suitable gas. Then, as reactor operation proceeds, the gas-filled rod expands and increases in length until it engages a spike mounted on the adjacent portion of the top nozzle. The spike pierces the upper end plug of the rod and permits the rod to fill with water. Such approach is described in U.S. Pat. No. 4,371,495 to Marlatt.

Still another approach to displacement removal is to withdraw water displacer rods at the desired time by using a drive mechanism. This approach U.S. Pat. No. 4,432,934 to Gjersten et al.

A further approach to removal of moderator displacement is described in U.S. Pat. No. 4,687,621 to Ferrari. A rod is provided which contains a burnable poison material, such as a boron substance in a form which is water soluble, that generates helium gas. The rod also has a region, such as a rupturable disc-like portion of one end plug, which is specifically fabricated to fail when the helium gas within the rod reaches a given high internal pressure. Also, by varying the initial internal pressure within different groups of the rods in the fuel assemblies, it is possible to have different groups of rods rupture at different times in the core cycle in order to phase-in removal of water displacement in increments.

While all of the above-cited prior approaches operate reasonably well and generally achieve their objectives under the range of operating conditions for which they were designed, a need still exists for an alternate approach to the problem of moderator displacement which is simpler, less costly and still can be tailored to take effect at the desired time during the core cycle.

SUMMARY OF THE INVENTION

The present invention provides a spectral shift-producing subassembly designed to satisfy the aforementioned needs. The subassembly of the present invention is composed of a plurality of sealed empty rodlets incorporating thinned wall sections which, after a desired number of months of reactor operation, will creep collapse and fail permitting moderator water to enter and fill the empty rodlets. In such manner, the rodlets incorporate a spectral shift-producing capability.

Accordingly, the present invention is directed to a spectral shift-producing subassembly for use with a nuclear fuel assembly in a nuclear reactor core. The subassembly comprises: (a) at least one elongated hollow empty tubular rodlet being hermetically sealed at its opposite ends and having an axially-extending annular wall section of reduced thickness compared to the thickness of the remainder of the rodlet adapting the material of the reduced thickness wall section of the rodlet to creep collapse and rupture after a desired extended period of use in a nuclear reactor core permitting moderator in the core to enter and fill the empty rodlet and produce a spectral shift; and (b) means for mounting the rodlet in the nuclear fuel assembly.

Preferably, the subassembly includes a plurality of such water displacement rodlets. The respective reduced thicknesses of the axial wall sections of the rodlets can be varied to adapt the rodlets to rupture at different times and permit water to enter the rodlets to produce an increase in the water/fuel ratio and thereby an increase in reactivity. The rodlets can also have different levels of pressurization to initiate rupture at different times.

These and other features and advantages of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings in which:

FIG. 2 is an enlarged elevational view of the spectral shift-producing subassembly of FIG. 1 removed from the fuel assembly, showing the rodlets of the subassembly in vertically foreshortened form.

FIG. 3 is a top plan view of the subassembly as seen along line 3—3 of FIG. 2.

FIG. 4 is an enlarged, vertically foreshortened, axial sectional view of one of the spectral shift-producing rodlets of the subassembly of FIG. 2, showing an axially-extending wall section of reduced thickness.

FIG. 5 is an enlarged fragmentary view of the wall section of reduced thickness in the rodlet of FIG. 4.

FIG. 6 is a view similar to that of FIG. 5, but showing the wall section of a different reduced thickness than that shown in FIG. 5.

FIG. 7 is a view similar to that of FIG. 5, but showing the wall section after rupture.

DETAILED DESCRIPTION OF THE INVENTION

Figure 1:
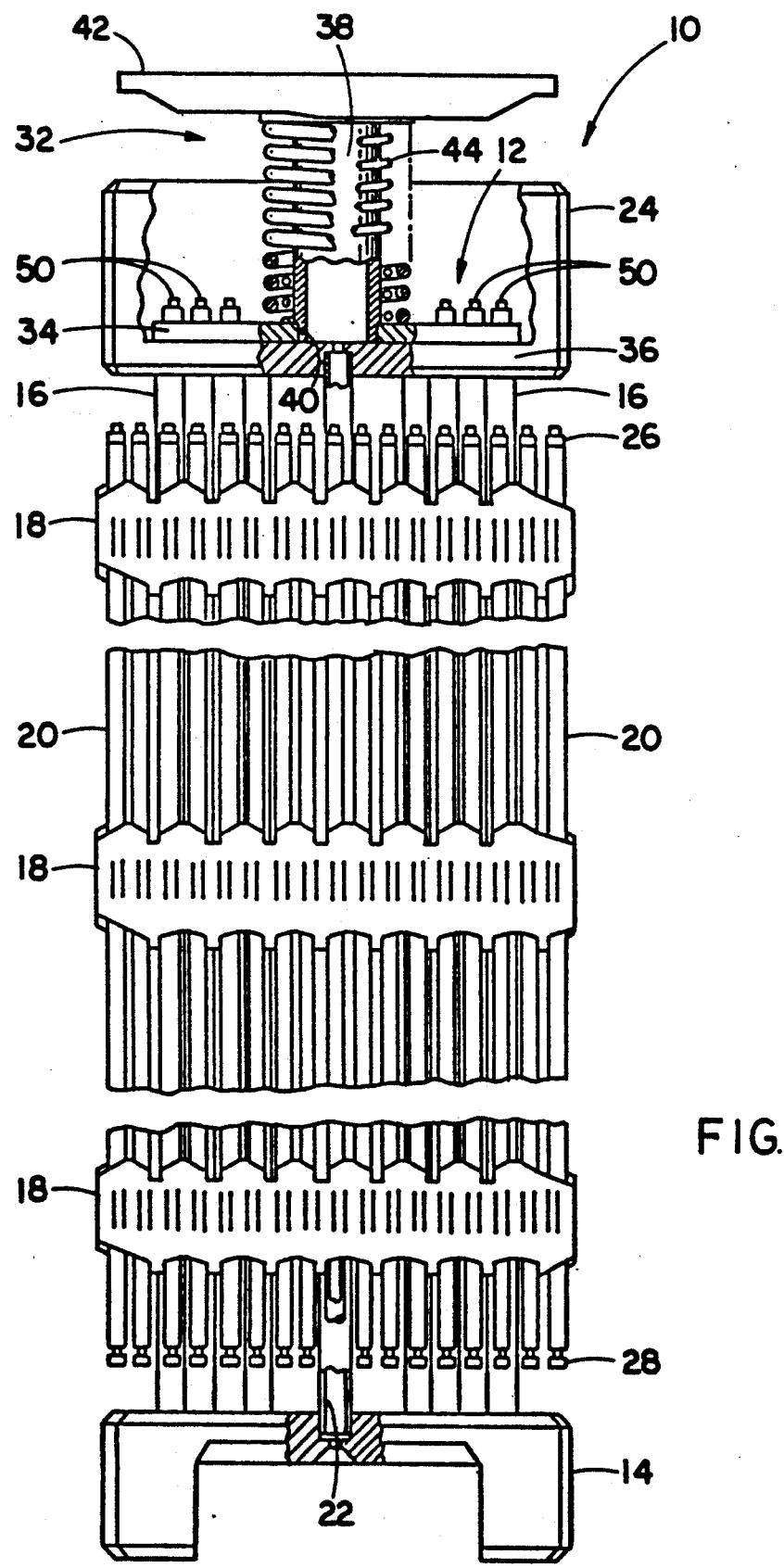
FIG. 1 is an elevational view, partly in section, of a fuel assembly which incorporates a subassembly of spectral shift-producing rodlets, the fuel assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is illustrated a nuclear fuel assembly, represented in vertically foreshortened form and being generally designated by the numeral 10, that can incorporate a spectral shift-producing subassembly, generally designated 12, of the present invention which will be described later on. The fuel assembly 10 is the type used in a pressurized water reactor (PWR) and basically includes a lower end structure or bottom nozzle 14 for supporting the fuel assembly on the lower core plate (not shown) in the core region of a nuclear reactor (not shown), and a number of longitudinally extending guide tubes or thimbles 16 which project upwardly from the bottom nozzle 14. The fuel assembly 10 further includes a plurality of transverse grids 18 axially spaced along the guide thimbles 16, and an organized array of elongated nuclear fuel rods 20 transversely spaced and supported by the grids 18. Also, the fuel assembly 10 has an instrumentation tube 22 located in the center thereof and an upper end structure or top nozzle 24 attached to the upper ends of the guide thimbles 16. With such an arrangement of parts, the fuel assembly 10 forms an integral unit capable of being conventionally handled without damaging the assembly parts.

As mentioned above, the fuel rods 20 in the array thereof in the assembly 10 are held in spaced relationship with one another by the grids 18 spaced along the fuel assembly length. Each fuel rod 20 includes nuclear fuel pellets (not shown) and the opposite ends of the fuel rod 20 are closed by upper and lower end plugs 26, 28. The fuel pellets composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

Spectral Shift-Producing Subassembly

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, provide means to maintain the reactivity relatively constant over its lifetime.

The present invention relates to such means in the form of the spectral shift-producing subassembly 12 having a plurality of hermetically-sealed hollow tubular empty rodlets 30 inserted in the guide thimbles 16 of the fuel assembly 10, as shown in FIG. 1. The sealed empty rodlets 30 of the subassembly 12 are stationarily supported in the fuel assembly 10 by a mounting means in the form of a holddown mechanism 32. The sealed empty rodlets 30 are capable of displacing moderator water while in their sealed condition within the fuel assembly 10. The holddown mechanism 32 supports the rodlets 30 in the guide thimbles 16 of some of the fuel assemblies 10 in the core to assist in controlling reactivity over the life of the core.

As best seen in FIGS. 2-4, the holddown mechanism 32 of the spectral shift-producing subassembly 12 supports the water displacement rodlets 30 in generally parallel, spaced side-by-side relationship. The holddown mechanism 32 includes a lower flat perforated support plate 34 which fits within the fuel assembly top nozzle 24 and rests on a lower adapter plate 36 of the top nozzle 24. The holddown mechanism 32 also includes a central sleeve 38, being attached at its lower end within a central opening 40 in the support plate 34 and extending upwardly therefrom, and an upper holddown plate 42 which receives the central sleeve 38 and is slidable vertically along it. Further, a holddown coil spring 44 is disposed about the central sleeve 46 and extends between the lower support plate 34 and the upper holddown plate 42.

Thus, the support plate 34 is held down against the top nozzle lower adapter plate 36 by the coil spring 44 which is compressed by the upper core plate (not shown) acting through the upper holddown plate 42 which abuts the upper core plate. This arrangement assures that the water displacement rodlets 30 which are attached to the holddown support plate 34 cannot be ejected from the reactor core by coolant flow forces while any thermal growth of the rodlets 30 is accommodated.

Turning next to FIG. 4 as well as FIG. 2, there is shown one embodiment of the water displacement rodlet 30 of the spectral shift-producing subassembly 12 of the present invention. The rodlet 30 is hermetically sealed at its opposite ends. The rodlet 30 basically includes an elongated hollow empty tube 46 having an elongated annular (preferably, cylindrical) wall 48, and opposite upper and lower end plugs 50, 52 hermetically sealed to the opposite ends of the tube 46. The upper end plug 50 includes a threaded upper end 50A and an enlarged diameter annular collar 50B spaced below it for facilitating attachment of the rodlet 30 to the holddown support plate 34 of the holddown mechanism 32. The tube 46 and end plugs 50, 52 can be composed of any suitable material, such as zirconium-based alloy.

The tube wall 48 of the rodlet 30 has a weakened section in the form of an axially-extending annular wall section 54 of reduced thickness compared to the thickness of the remainder of the wall 48 of the tube 46. The reduction in the thickness of the wall section 54 of the rodlet 30 adapts it to creep collapse and rupture after a desired extended period of use in the nuclear reactor permitting moderator to enter and fill the empty rodlet.

In such manner, the displacement of water by the rodlet 30 is produced resulting in an increase in the water/fuel ratio and thereby an increase in reactivity through the occurrence of a spectral shift.

Referring to FIGS. 5-7, the respective reduced thicknesses of the axial wall sections 54A, 54B of first and second groups of the rodlets 30A, 30B are different to adapt the rodlets 30A, 30B to rupture at different times and permit water to enter the rodlets at different times to produce an incremental increase in the water/fuel ratio and thereby an incremental increase in reactivity. The rodlets 30A, 30B can also have different levels of internal pressurization, such as by helium gas, to initiate rupture at different times.

The axial length of the thinned wall sections is small in comparison to the overall length of the rodlet 30. As an example, the rodlet 30 can be the same length as a nuclear fuel assembly, whereas the wall section 54 can be only six inches in length. The outside diameter of the rodlets 30 is the maximum amount possible to permit the rodlets to fit in the guide thimbles 16 and still not interfere with the guide thimble so as to create problems during removal of the subassembly 12 during refueling.

The reduced thicknesses and pressurization of the rodlets 30 would be preset such that the ruptures occur sometime between the middle and the end of the reactor fuel cycle. The increase in water in the guide thimbles 16 after the rodlets 30 fail results in about a 6% change in the H/U ratio which corresponds to a 3% decrease in fuel cycle costs. The 3% decrease in fuel cycle cost is equivalent to $45-$60 kg U fabrication cost improvement. It should be noted that the present invention is very tolerant to some of the spectral shift-producing rodlets not failing during the cycle or failing somewhat sooner or later than desired since the overall gross effect is what is desired and small changes do not significantly affect either safety or economics.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A spectral shift-producing subassembly for use with a nuclear fuel assembly in a nuclear reactor, said subassembly comprising:
   (a) at least one elongated hollow empty tubular rodlet being hermetically sealed at its opposite ends and having an axially-extending annular wall section of reduced thickness compared to the thickness of the remainder of said rodlet thereby adapting said reduced thickness wall section of said rodlet to creep collapse- and rupture after a desired extended period of use in a nuclear reactor permitting moderator liquid in the reactor to enter and fill the empty rodlet and produce a spectral shift; and
   (b) means for mounting said rodlet in the nuclear fuel assembly.

2. The subassembly as recited in claim 1, wherein said rodlet includes:
   an elongated hollow empty tube having an elongated annular wall; and
   end plugs hermetically sealed to opposite ends of said tube;
   said wall of said tube having said axially-extending annular wall section of reduced thickness compared to the thickness of the remainder of said wall of said tube.

3. The subassembly as recited in claim 1, wherein said rodlet includes a gas contained at a predetermined internal pressure.

4. The subassembly as recited in claim 1, wherein said mounting means is a holddown mechanism.

5. A spectral shift-producing subassembly for use with a nuclear fuel assembly in a nuclear reactor, said subassembly comprising:
   (a) a plurality of elongated hollow empty tubular rodlets, each rodlet being hermetically sealed at its opposite ends and having an axially-extending annular wall section of reduced thickness compared to the thickness of the remainder of said rodlet thereby adapting said reduced thickness wall section to creep collapse and rupture after a desired extended period of use in a nuclear reactor permitting moderator to enter and fill the empty rodlet and produce a spectral shift; and
   (b) means for mounting said rodlets in the nuclear fuel assembly in spaced side-by-side relationship to one another.

6. The subassembly as recited in claim 5, wherein each of said rodlets includes:
   an elongated hollow empty tube having an elongated annular wall; and
   end plugs hermetically sealed to opposite ends of said tube;
   said wall of said tube having said axially-extending annular wall section of reduced thickness compared to the thickness of the remainder of said wall of said tube.

7. The subassembly as recited in claim 6, wherein the respective reduced thicknesses of said axial wall sections of a first group of said rodlets are different from the reduced thicknesses of said axial wall sections of a second group of said rodlets thereby adapting said rodlets of said first group to rupture at different times than said rodlets of said second group.

8. The subassembly as recited in claim 6, wherein each of said rodlets includes a gas contained at a predetermined internal pressure.

9. The subassembly as recited in claim 8, wherein the internal pressure of the gas in a first group of said rodlets is different from the internal pressure of the gas in a second group of said rodlets thereby adapting said rodlets of said first group to rupture at different times than said rodlets of said second group.

10. The subassembly as recited in claim 5, wherein said mounting means is a holddown mechanism.

11. In a nuclear reactor having fuel assemblies and a moderator coolant liquid flowing through said fuel assemblies, each fuel assembly including an organized array of nuclear fuel rods wherein said moderator coolant liquid flows along said fuel rods, a spectral shift-producing subassembly supported on selected ones of said fuel assemblies, said subassembly comprising:
   (a) a plurality of elongated hollow empty tubular rodlets, each rodlet being hermetically sealed at its opposite ends and having an axially-extending annular wall section of reduced thickness compared to the thickness of the remainder of said rodlet thereby adapting said reduced thickness wall section to creep collapse and rupture after a desired extended period of use in the nuclear reactor permitting moderator in the reactor to enter and fill the empty rodlet and produce a spectral shift; and (b) means for mounting said rodlets in said selected fuel assemblies in spaced side-by-side relationship to one another.

12. The subassembly as recited in claim 11, wherein each of said rodlets includes:

an elongated hollow empty tube having an elongated annular wall; and end plugs hermetically sealed to opposite ends of said tube;

said wall of said tube having said axially-extending annular wall section of reduced thickness compared to the thickness of the remainder of said wall of said tube.

13. The subassembly as recited in claim 12, wherein the respective reduced thicknesses of said axial wall sections of a first group of said rodlets are different from the reduced thicknesses of said axial wall sections of a second group of said rodlets thereby adapting said rodlets of said first group to rupture at different times than said rodlets of said second group.

14. The subassembly as recited in claim 12, wherein each of said rodlets includes a gas contained at a predetermined internal pressure.

15. The subassembly as recited in claim 14, wherein the internal pressure of the gas in a first group of said rodlets is different from the internal pressure of the gas in a second group of said rodlets thereby adapting said rodlets of said first group to rupture at different times than said rodlets of said second group.

16. The subassembly as recited in claim 11, wherein said mounting means is a holddown mechanism.

* * * * *